Apr. 17, 1923. 1,451,703
G. M. LUDLOW
COMPUTING SCALE WITH INTERCHANGEABLE CHARTS
Filed Mar. 10, 1921

Witness:
R. Burkhardt

Inventor:
George M. Ludlow,
By Wilkinson, Huxley, Byron & Knight
Attys.

Patented Apr. 17, 1923.

1,451,703

UNITED STATES PATENT OFFICE.

GEORGE M. LUDLOW, OF CHICAGO, ILLINOIS, ASSIGNOR TO SANITARY SCALE COMPANY, OF CHICAGO, ILLINOIS, A CORPORATION OF ILLINOIS.

COMPUTING SCALE WITH INTERCHANGEABLE CHARTS.

Application filed March 10, 1921. Serial No. 451,205.

*To all whom it may concern:*

Be it known that I, GEORGE M. LUDLOW, a citizen of the United States, residing at Chicago, in the county of Cook and State of Illinois, have invented certain new and useful Improvements in Computing Scales with Interchangeable Charts, of which the following is a specification.

This invention relates to weighing scales, and is designed primarily for that type of weighing scales in which a reciprocatory movement of the platform or other load bearing member, hereinafter referred to as "the loading element," as well as that of the weighing means, hereinafter referred to as "the counterbalancing element," and which is preferably also of a reciprocatory type, is translated into a rotary motion and imparted to indicators in the form of drums carrying charts which bear the calibration indicia of the scale, together with computations, such as products alined with the several calibrations and with markings on an associated pricelist.

It has heretofore been the practice to mount the translating unit, or parts thereof, directly upon the chart drums in scales of this kind, so that when it became necessary to replace a chart drum on account of impairment or for substitution of a differently calibrated chart, it was necessary to disassociate the elements of the translating unit. This so disarranged the relations of the delicately adjusted mechanism and involved such duplication of parts with the charts that the practice has been to substitute an entire scale when a different calibration was desired.

One object of the present invention is to so construct a scale that a chart or charts of cylindrical form may be removed therefrom and replaced by other charts conveniently by persons not skilled in the assembly and adjustment of the weighing mechanism and with a minimum cost of parts associated with the charts, so that a scale once sold and in use may be changed at a minimum of expense. Accordingly, one feature of the present invention consists in mounting the motion imparting member wholly independently of the chart drum or drums, and preferably in permanent relation to the loading and counterbalancing elements, and providing means for releasably supporting the chart drum through its axis of revolution in driven relation to said motion imparting member and providing a casing for the chart with a wall corresponding to the transverse projection of the cylinder of the chart, movable so that the charts will be easily removable by a bodily movement transverse to its axis without in any way disturbing the motion imparting member or its connections with the loading element. A subordinate feature incident to this broad feature of the invention consists in releasably supporting one end of the chart drum upon the translating unit, and sustaining the other end of said drum upon a bearing which is displaceable to release the drum from the translating unit.

Another object of the present invention is to provide an improved construction of translating unit for use in scales of the type described, and particularly one which will involve a minimum of lost motion and friction. Accordingly, another feature of the invention consists in constructing the translating unit of a revolving barrel having bearings which sustain it independently of the chart drums, both in the direction of its axis and transversely thereto, a flexible connector wound upon the barrel and having its ends extended therefrom for use in imparting motion to the barrel in both rotary directions, and a yoke which sustains the respective ends of the flexible connector and which is itself connected to receive motion imparted through the loading element and the counterbalancing element. A subordinate feature incident to this part of the invention consists in interposing a resilient member between the flexible connector and the yoke for the combined purpose of keeping the flexible connector under tension and absorbing the shock of sudden movement which one or both of the actuating elements might otherwise impose upon the flexible connector and the parts which it drives.

In the accompanying drawing—

Figure 1:
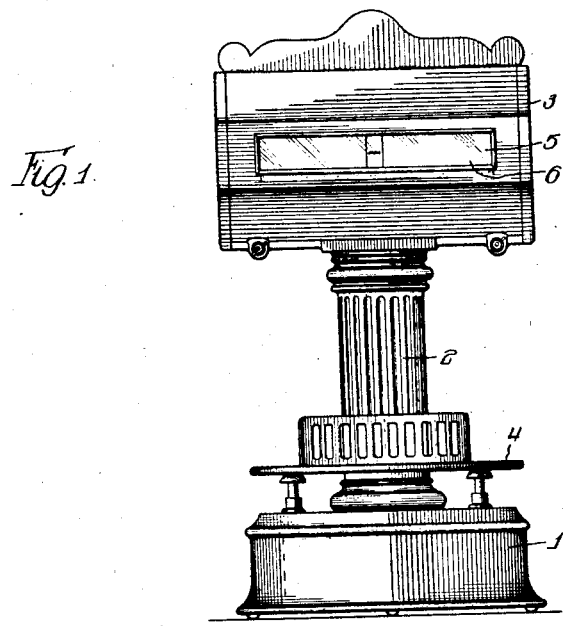
Figure 1 is a front elevation of a scale of the type in which the present invention is preferably embodied.

1 represents the base, 2 the supporting column, and 3 the upper casing of a computing scale of known type, which generally embodies in its construction a loading platform 4, a window 5 through which the scale is read, and a price bar 6. Within the casing 3 are chart drums 7, the steelyard rod 8, and counterbalancing springs 9 which develop reciprocatory movements translated to the drums 7 as rotary or oscillatory movement, and which may be of known construction except as hereinafter noted.

According to the present invention, the rod 8 which constitutes the loading element, and which is drawn downward by the load on the platform and upward by the counterbalancing springs 9, is connected with the drum or drums 7 through the medium of a translating unit 10 that is supported in bearings 11 wholly independent of the drum 7 and in permanent relation to the reciprocatory loading and counterbalancing elements by which it is moved; and the drum 7, which may thus be made of very simple construction and comprising merely a shaft 7ª for supporting the cylindrical surface of the drum upon which the chart is mounted, is carried at one end in the socket 12 of the translating unit and its other end in the bearing 13, with readily releasable driving connection in said socket 12 and sufficient adjustability in the bearing 13 to permit the drum to be withdrawn from the translating unit and readily removed from the scale and replaced by a drum bearing a different chart whenever desired. Bearing 13 preferably consists of a frame 13ª with guides 13ᵇ to receive the shaft 7ª, and anti-friction wheels 13ᶜ upon which said shaft rests; said frame 13ª resting upon the fixed bracket 14 and adjustably secured thereto by set screw 15.

Figure 3:
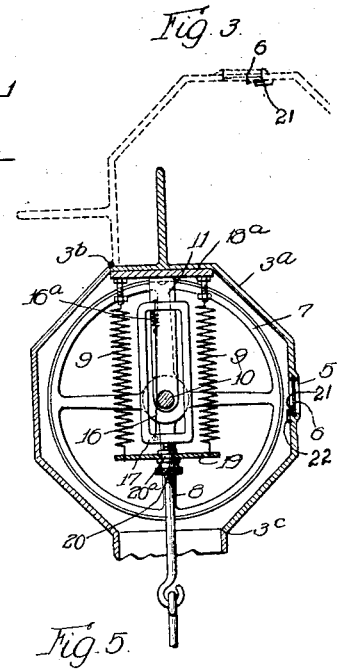
Figure 3 is a transverse section on the line 3×—3× of Figures 1 and 2.

The casing 3 of the scale is preferably divided and provided with a movable closure 3ª corresponding substantially to the transverse projection of the cylinder of the chart hinged at 3ᵇ and having its free edge at 3ᶜ, so that it can be opened up, as suggested in dotted lines in Figure 3, to give acess to the chart drum and permit its removal. Thus the supporting frame for the chart and the translating device are maintained intact, and the chart is rendered removable bodily in a direction transverse to its axis without disengaging the steelyard rod or the vertically reciprocating member which it actuates. In the preferred and illustrative embodiment herein disclosed, the rotary member of the translating device is likewise left undisturbed.

Figure 2:
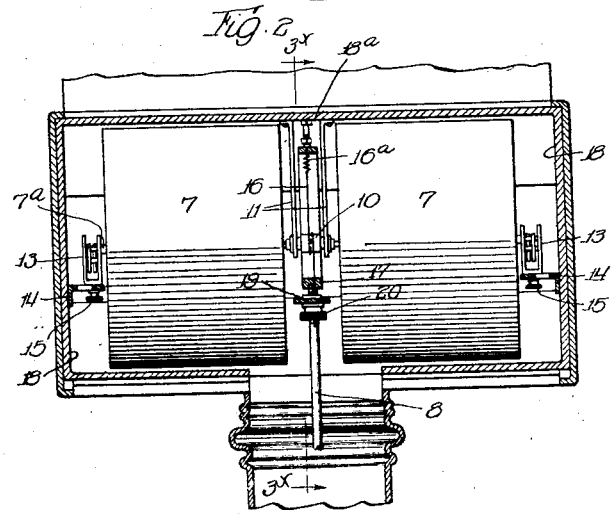
Figure 2 is a vertical section through the upper portion of the scale shown in Figure 1.
Figures 4, 6:
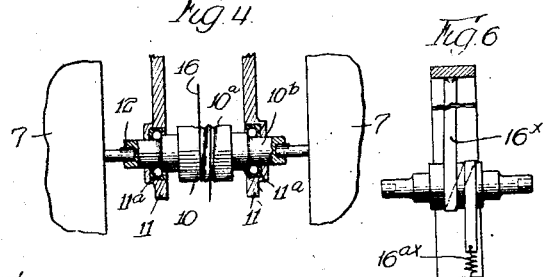
Figure 4 is a detail view of the translating unit.
Figure 6 is a detail view showing a modified construction of translating unit.
Figure 5:
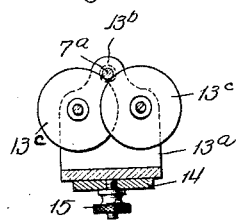
Figure 5 is a detail view of the movable bearing for the outer end of a chart drum.

Translating unit 10 consists of a barrel 10ª having shouldered trunnions 10ᵇ resting in the bearings 11ª of the brackets 11, and about this barrel 10 is wound a flexible connector 16, the ends of which are connected to a yoke 17 mounted on the upper end of the rod 8 so that the yoke is adapted to impart rotary movement in both directions to the barrel 10ª. A resilient element 16ª is preferably interposed between the flexible connector 16 and the yoke 17 for the combined purpose of keeping the flexible connector taut and taking up shock or sudden movement transmitted through the flexible connector. As shown in Figures 2 and 4, the flexible connector is in the form of a round strand, but as suggested in Figure 6 it may be in the form of a flat tape 16ˣ, and it may have its resilient member 16ᵃˣ at bottom to absorb the shock developed by throwing the load upon the platform as well as keeping the flexible connector taut.

In referring to the translating unit as being in permanent relation to the loading and counterbalancing elements in the specification and claims, it is intended to convey the condition of having the translating unit, which must accurately interpret the movements of the loading and counterbalancing elements, so related to those elements that it will not be necessary to readjust their connections in order to remove or replace a chart. In some instances it may be necessary to shift the translating unit in releasing and reengaging a chart member, but this will be done without disarranging the transmitting value of the connections with the translating unit.

The scale will preferably have means for readily substituting one price-strip for another, and accordingly, window 5 that receives the price-strip 6 will be constructed in the movable member 3ª of the casing 3, and said price-strip is made to slide readily into and out of the track provided by the confining rails 21.

Counterbalancing springs 9 are suspended from the top rail 18ª of the main supporting frame 18, and sustain the load to be weighed through the medium of the yoke 19 suspended from the lower ends of the springs and fitted around the neck 20ª of the sleeve 20 which is threaded upon the rod 8 and therefore capable of adjusting rod 8 vertically with relation to the springs and thereby zeroizing the scale.

I claim:

1. In a scale, a rotary cylindrical chart, axial bearings in which said chart is releasably mounted, and a casing for said chart having a movable wall corresponding in position to the geometrical projection of the chart in a direction transverse to the axis of the chart, and providing by its movement an opening that permits removal of the chart bodily in the direction of such projection.

2. In a scale, a rotary cylindrical chart, axial bearings releasably mounting said chart, motion transmitting means having releasable driving connection with said chart, and a casing surrounding said chart having a wall corresponding in position to the geometrical projection of the chart in a direction transverse to its axis of insertion; said wall being movably mounted and permitting the chart, independently of its bearings and transmitting means, to be removed and replaced bodily in the direction of such projection.

3. In a scale, a casing, a cylindrical chart having an axial shaft through which it is rotatably supported, bearings in said casing adapted to receive and release said shaft at will, and a motion transmitting member mounted in said casing, independently of said shaft but imparting rotary motion thereto; said casing having a movable wall corresponding in position to the geometrical projection of the cylinder of the chart in a direction transverse to its axis of revolution, and permitting removal and replacement of a chart independently of its bearings and motion transmitting member.

4. A weighing scale having loading and counter-balancing elements, an indicating chart, and a divided driving spindle, one part of which is connected with the loading and counterbalancing elements in translating relation thereto, and the other part of which is connected with the indicating chart and has separable driving connection with the spindle part first named.

5. In a weighing scale, loading and counterbalancing elements, a chart for indicating weights corresponding to the movements of said elements, a divided spindle having one part in translating relation to the loading and counterbalancing elements and its other part connected with the chart, and a coupling adapted to connect said spindle parts and to insure their union with the readings of the chart in true interpretative relation to the movements of said elements.

6. An interchangeable chart scale, comprising an oscillatory indicating chart, a translating unit for driving the same, and a spindle divided into driving and driven parts, of which the driving part is mounted independent of the driven part and incorporated in the translating unit, and the driven part has separable connection with the driving part and is carried by and removable from the scale with the indicating chart.

7. An interchangeable chart scale, comprising an oscillatory indicating chart, a translating unit for driving the same, and a spindle divided into driving and driven parts of which the driving part is mounted independent of the driven part and incorporated in the translating unit, and the driven part has separable connection with the driving part and is carried by and removable from the scale with the indicating chart; means being provided for assembling the parts of said spindle in predetermined circumferential relation to insure proper indication by the chart of the position of the translating mechanism.

8. In a weighing scale having loading and counterbalancing elements and an indicator therefor, a translating unit for transmitting movement to the indicator from said elements, and a mounting supporting said translating unit independently of said indicator; said indicator having means releasably supporting it in driven relation to said unit.

9. In a weighing scale having loading and counterbalancing elements and an indicator therefor, a translating unit for transmitting movement to the indicator from said elements, and a mounting supporting said translating unit independently of said indicator; the unit being constructed with a support for the indicator; and the indicator being provided with means for releasably holding it in said support.

10. In a weighing scale having loading and counterbalancing elements and an indicator therefor, a translating unit interposed between the indicator and said elements, bearings supporting said unit independently of the indicator, means carried by said unit for releasably supporting one end of the indicator, and a support for the opposite end of the indicator movable to release the indicator from said unit.

11. In a weighing scale, loading and counterbalancing elements, a plurality of indicators for said elements, and a translating unit interposed between said elements and indicators supported independently of the indicators, and having independent releasable driving connections therewith.

12. In a weighing scale, loading and counterbalancing elements, a pair of coaxially arranged chart drums, and a translating unit supported between said drums but independently thereof, and having driven connection with each of said elements.

13. In a weighing scale having reciprocatory loading and counterbalancing elements and an oscillatory indicator, a translating unit interposed between the indicator and said elements, and means mounting said unit independently of said indicator; said unit comprising a rotary member constructed for releasably receiving the indicator and a reciprocatory member for driving said rotary member.

14. In a weighing scale having reciprocatory loading and counterbalancing elements and an oscillatory indicator, a translating unit interposed between the indicator and said elements, and means mounting said unit independently of said indicator; said unit comprising a rotary member constructed to receive the indicator, and a flexible member wound on said rotary member and driving the latter in both directions.

15. In a weighing scale, a reciprocatory loading element, a counterbalancing element therefor, a rotary barrel oscillated by said element, means supporting said barrel with freedom of rotation, a pair of chart drums coaxially alined with said barrel and each supported at one end by said barrel, and bearings supporting the ends of said drums which are remote from said barrel.

16. In a weighing scale, weighing mechanism, a movable chart for indicating movements of said weighing mechanism, means for releasably mounting said chart in driven relation to said weighing mechanism, and means for interchangeably mounting price-strips in position to be read with the readings of said chart.

17. In a weighing scale, weighing mechanism, a movable chart for indicating movements of said weighing mechanism, means for releasably mounting said chart in driven relation to said weighing mechanism, and means for interchangeably mounting price-strips in position to be read with the readings of said chart; said scale having a casing with a movable wall that permits the introduction and removal of the chart; said movable wall carrying said price-strips.

Signed at Chicago, Illinois, this 8th day of March, 1921.

GEORGE M. LUDLOW.